Aug. 28, 1934.  O. T. McILVAINE  1,971,423
VACUUM GAUGE
Filed April 10, 1929
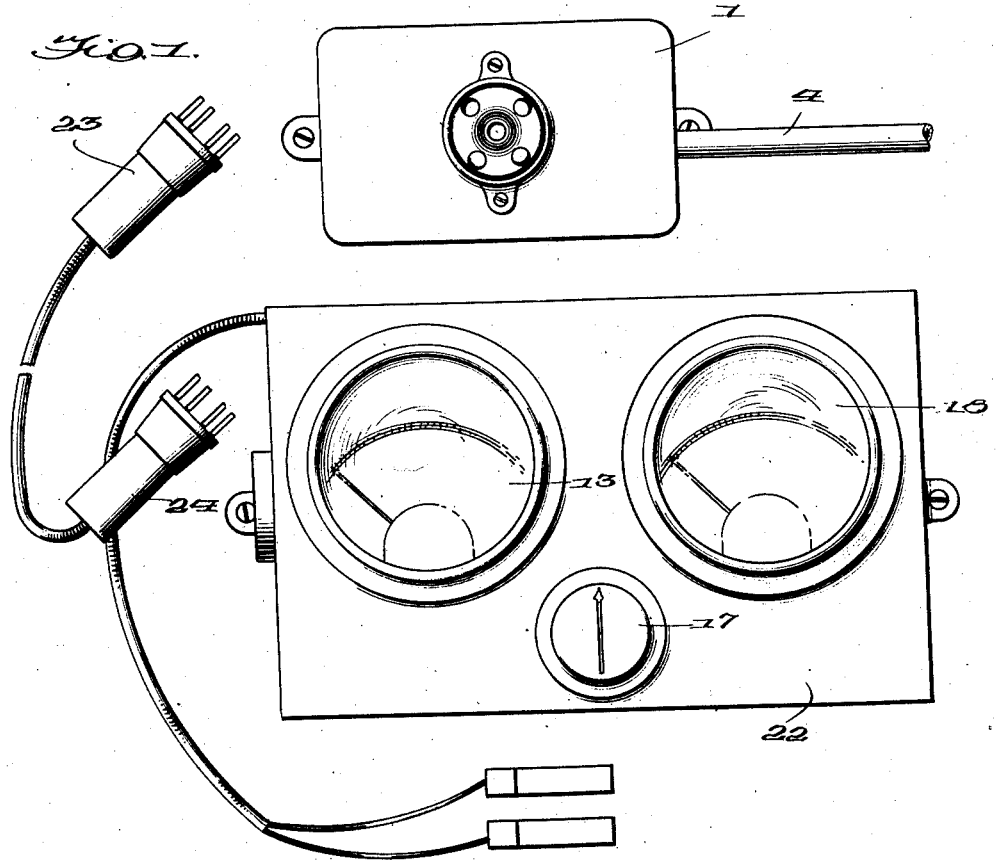
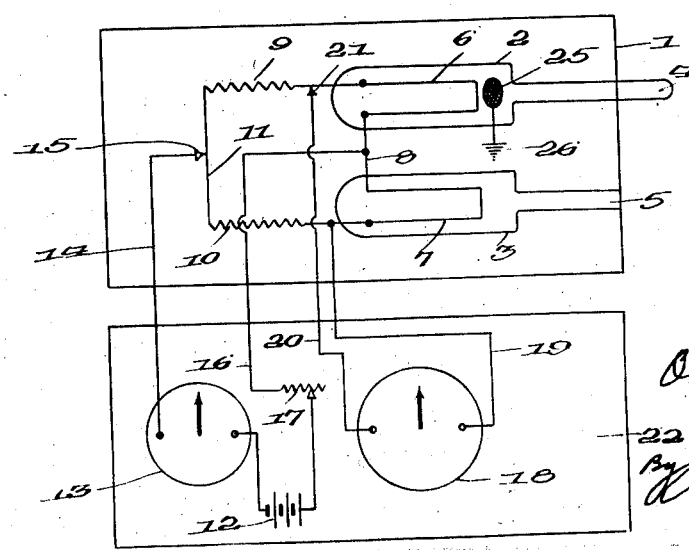

Patented Aug. 28, 1934

1,971,423

UNITED STATES PATENT OFFICE 1,971,423

VACUUM GAUGE

Oran T. McIlvaine, Cleveland, Ohio, assignor to McIlvaine Patent Corporation, St. Charles, Ill., a corporation of Delaware Application April 10, 1929, Serial No. 354,038

4 Claims. (Cl. 73—31)

This invention relates to an improvement in vacuum gauges.

The object of the invention is to provide for indicating the exact degree of vacuum in an evacuating system to which the gauge may be connected. The gauge and indicating mechanism are entirely electrical in operation, and the indicating mechanism may be installed at any point, either at the machine with the gauge or at any other point desired.

The gauge provides for instantaneous and continuous reading of the degree of vacuum in the vacuum system and may be applied to any type of pump or exhaust machine, being very easily installed or moved. At the same time and by reason of its being entirely electrical, the degree of vacuum is accurately indicated from the very lowest to the highest degree.

In the accompanying drawing:

Fig. 1 is a plan view of the gauge; and

Fig. 2 is a diagrammatic view of the same.

The numeral 1 indicates a gauge casing, within which are arranged two glass bulbs 2 and 3. The bulb 2 is adapted to be connected to the vacuum system through the glass or other tube 4, at the point where the vacuum reading is desired. The other bulb 3 is open to the atmosphere as at 5.

Sealed within the glass bulbs 2 and 3 are filaments 6 and 7 respectively, which may be of nickel or other desirable metal, which are connected together in series by a wire 8. The opposite sides of the filaments 6 and 7 are also connected in series with resistances 9 and 10 respectively, which resistances are connected together as at 11.

D. C. current is supplied from a suitable battery 12, which may be of approximately six bolts, through a meter 13 and wire 14, which is connected by the contact 15 to the wire 11 and through the latter wire to the resistances 9 and 10, and through these resistances to the filaments 6 and 7, returning through the wire 8 and a wire 16 to a rheostat 17. The amount of current is regulated by this rheostat according to the degree of vacuum being measured. The vacuum indicating meter is designated at 18 and has one side connected by the wire 19 to the connection between the filaments 7 and the resistances 10, while the other side of the meter 18 is connected as at 20 and the contact 21 between the filament 6 and the resistance 9.

As a matter of convenience, the indicating meters 13 and 18 and the rheostat 17 may be arranged in a casing 22, and plugs 23 and 24 connected together through suitable wires may be used to connect the casings 1 and 22 together and to connect the gauge proper with the indicating meters and rheostat, as clearly shown in Fig. 1.

In using the gauge, the glass tube 4 should be connected to the point of the exhaust system where the vacuum reading is desired, and the gauge 13 and rheostat 17 connected with the battery or source of electrical supply. The plugs are inserted for electrically connecting the filaments and resistances with the indicating meters and rheostat. By turning the rheostat to regulate the amount of current flowing through the resistances and filaments, which is indicated by the meter 13, the amount of vacuum in the vacuum system will be indicated on the meter 18. This is caused by reason of the evacuation of the bulb 2 by its connection with the vacuum system while the bulb 3 communicates with the atmosphere and contains atmospheric pressure, which throws the filaments 6 and 7 out of balance, the difference in resistance between the two filaments being indicated on the meter 18.

The greater the vacuum in the vacuum system, the greater the difference indicated on this meter.

A shield 25 is placed in the bulb 2, which is connected to the vacuum system and which shield is grounded as at 26. This prevents the gauge from reading improperly when a spark or high-frequency discharge is present in the exhaust system. This shield, being grounded, shields the gauge from interference by this discharge.

I claim:

1. In a gauge of the character described a bulb adapted to be evacuated, a filament extending into said bulb, a source of electrical supply connected with the filament, and a shield for the bulb and adapted to be grounded.

2. A gauge of the character described including a plurality of bulbs, at least one of which is adapted to be connected with an evacuating system, and another of the bulbs containing a predetermined pressure, filaments disposed in the bulbs and having corresponding sides connected together, means connected with the filaments for indicating a difference in resistance between the filaments, and a shield associated with the bulb connected with the evacuating system and adapted to be grounded to prevent interference with the gauge.

3. In a gauge of the character described, a bulb adapted to be connected with a source of evacuation, an electrical heating element in said bulb, and an electric discharge shield for the bulb and adapted to be grounded, said shield being disposed between the heating element and the source of evacuation.

4. In a gauge of the character described, a bulb adapted to be evacuated, an electrical heating element in said bulb, and a shield adapted to be grounded and disposed within the bulb between the heating element and the evacuating side of the bulb.

ORAN T. McILVAINE.